United States Patent [19]
Reardon

[11] Patent Number: 5,434,562
[45] Date of Patent: Jul. 18, 1995

[54] METHOD FOR LIMITING COMPUTER ACCESS TO PERIPHERAL DEVICES

[76] Inventor: David C. Reardon, 50 Nottingham, Springfield, Ill. 62704

[21] Appl. No.: 89,637

[22] Filed: Jul. 12, 1993

Related U.S. Application Data

[63] Continuation of Ser. No. 755,866, Sep. 6, 1991, abandoned.

[51] Int. Cl.6 .............................................. G07D 7/00
[52] U.S. Cl. ........................... 340/825.34; 340/825.31; 380/4
[58] Field of Search ...................... 340/825.31, 825.32, 340/825.34, 825.5; 380/4, 25

[56] References Cited

U.S. PATENT DOCUMENTS

| | | | |
|---|---|---|---|
| 4,617,650 | 10/1986 | Morino et al. | 365/195 |
| 4,951,249 | 8/1990 | McClung et al. | 340/825.34 |
| 4,975,950 | 12/1990 | Lentz | 380/4 |
| 5,012,514 | 4/1991 | Renton | 380/4 |
| 5,144,659 | 9/1992 | Jones | 340/825.31 |
| 5,144,660 | 9/1992 | Rose | 380/4 |
| 5,289,540 | 2/1994 | Jones | 340/825.31 |
| 5,313,639 | 5/1994 | Chao | 340/825.31 |

FOREIGN PATENT DOCUMENTS 59-128638 11/1984 Japan.

*Primary Examiner*—Donald J. Yusko
*Assistant Examiner*—Gregg V. Miller

[57] ABSTRACT

One or more user accessible switches are provided by which the authorized user may fully or partially limit the computer's access to one or more of its peripheral devices. The switch inhibits power or control lines to the peripheral device, or enables the programming of access limits to the peripheral device, in a manner which cannot be overridden by the computer. This added level of control allows the user to control the computer's activities so that access to these peripheral devices is allowed only under secure conditions, so as to preclude alteration or destruction of data by unauthorized users or computer viruses. Methods are disclosed by which the switches can render peripheral devices totally inactive, or made to be temporarily read-only, write-only, or write-once in order to implement a number or security protocols for single or multi-user environments.

20 Claims, 1 Drawing Sheet

A Method For Limiting Computer Access to Peripheral Devices

METHOD FOR LIMITING COMPUTER ACCESS TO PERIPHERAL DEVICES This application is a continuation of patent Ser. No. 07/755,866, filed Sep. 6, 1991, now abandoned.

BACKGROUND—FIELD OF INVENTION

This invention relates to computer security measures and to the prevention of unauthorized reading or altering of computer data by individuals or programs operating on a computer. Specifically, this invention describes a means and process by which the authorized user of a computer can protect data and programs stored in peripheral devices, such as mass storage media, from alteration or deletion by malicious persons, or computer "virus" programs, or accidents initiated by unskilled persons. This end is achieved by providing the authorized user with a switch whereby the user can completely or partially disable the peripheral device without disrupting the operation of the computer or other peripherals. Alternatively, the switch may disable write access to the peripheral device, such as a widely used computer harddrive, but allow the device to be read.

This invention is particularly useful in multi-user environments, such as those in a university computer lab, wherein only a computer supervisor is authorized to add programs and data to a mass storage peripheral device and other users are authorized only to read programs and data from the storage device. In this example, the computer supervisor would have a key with which he could gain access to write new information onto a harddrive and then could "lock out" write access so that students would be unable to accidentally or maliciously load a "virus" program onto the computer system.

This invention is also useful for persons who desire to evaluate new software but are afraid that by doing so they will be exposing their computer system to infection with a computer virus. By locking out write access to their computer's harddrive, the system is "safe" and the suspect program can be run without risk of it causing an infection which may later cause loss or disruption of programs and data.

By providing complete user control over a computer's access to its peripheral devices, this invention allows the user to implement greater security precautions against unauthorized programs or users. These options include limiting read and write access to the peripheral device, and the ability to configure the peripheral device so as to make all or portions of the device appear to the computer as a read-only, write-only, or write-once peripheral device.

Background—Description of Prior Art

Protecting computer data and programs from unauthorized copying, destruction, or alteration is a major concern for governmental agencies, businesses, educational institutions, and individual users. In addition to protecting valuable data from spies or malicious programmers, there is a need to protect data from computer "virus" programs which can infect a system and cause damage at some later date.

Numerous computer security programs have been written to provide a large variety of features to protect computer data. These include such features as password protection, restricted access to specified files, limited menu options, checksum verification, and scanning for known virus programs or virus-like activities. The major shortcoming of these computer security programs is that they must operate within the computer's working memory space, its RAM. This means the security software is susceptible to other forms of software which can defeat the programs security measures.

The distinct advantage of the present invention is that it is a hardware security device which cannot be bypassed or defeated by software or keyboard programming.

Another advantage of the present invention is that it would allow the computer to be booted from a floppy and used as a floppy disk system, by either totally or partially inhibiting the hard drive. This feature may be of special interest in some multi-user situations.

For example, in a home environment, a father could lock out the harddrive so as to allow his children to boot up the computer and run games from a potentially "virus" infected floppy disk without risk that child or "virus" will intrude upon or damage any of his business programs or files on the hard drive.

Similarly, in a university setting, the present invention could be used to make the mass storage media "read only," thus allowing the students to read necessary data and programs from the hard drive but block out any attempts to write to the hard drive, thus forcing all student created files and documents to be stored on removable floppy diskettes. Alternatively, this process could be implemented to provide read only access to a protected portion of the harddrive which contains the executable programs and allow write access only to an unprotected portion of the harddrive dedicated to data storage.

SUMMARY OF INVENTION

The object, advantages, and features of the present invention are:

(a) to provide a computer user with a method for protecting a computer's security software from probing, alteration, bypass, or deletion;

(b) to provide a computer user with a method for protecting a computer's mass storage media from corruption by an unauthorized user or computer "virus";

(c) to provide user accessible switches by which the user can restrict the computer's access to all or portions of computer's peripheral devices.

(d) to provide an alarm means to notify users of an unauthorized attempt to write to a computer's peripheral devices, wherein such an attempt may indicate that a computer virus-like activity is taking place.

These and other objects are accomplished in accordance with the present invention by providing one or more user activated switches, which may be of a key-locking type, which totally or partially disable the computer's access to peripheral devices such as mass storage media or network communications.

DESCRIPTION OF INVENTION

Figure 1:
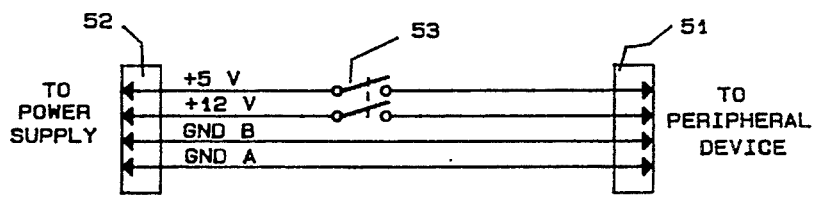
FIG. 1 is a schematic drawing of a power interception circuit between a host computer's CPU and a peripheral mass storage device.

For the purpose of this discussion, peripheral devices shall mean any device external to the central processing unit (CPU) of a computer, including mass storage media devices such as hard disk drives and their controllers, computer network interface cards, and other I/O devices. The term controller card refers to the electronics associated with the peripheral device which interface the device with the host computer, interpret the host computer's commands, and controls the peripheral devices activities, this controller card circuitry may be embedded in the peripheral device or remotely situated and in communication with the peripheral device. The term computer virus, or simply virus, refers to any potentially destructive computer program which may cause malfunction of the computer, corruption of files, loss of data, or other unwanted and unexpected results. The term unwanted memory loss refers to the condition of damaged, lost, or altered memory locations due to computer virus activity or accidental or malicious damage caused by person with access to the computer.

This invention describes a means and process by which to disable the computer's access to all or part of a computer's memory system or associated peripherals, so as to protect the computer from computer virus infections when using new or untested software. In addition, this invention can prevent erasure, alteration, or other damage to files stored on a harddrive or network due to accidental, negligent, or malicious behavior of persons with access to the computer.

The present invention achieves these ends by totally or partially disabling access to peripheral devices which may be subject to unwanted memory loss, typically these are mass storage media devices such as a harddrive. Typically, the disabling of the peripheral device is executed by the user operating a switch, which may be of a keylocking type, which fully or partially disables the peripheral device as long as the switch is activated. While this invention can be realized in many configurations which are familiar to persons practiced in electronics, six principle methods for implementing of this device are illustrative of the scope of this invention. The switch may be configured to either 1) physically disconnect the power supply to the mass storage media device and/or the communication link to the network;
2) physically disconnect control lines to the mass storage media device so as to disable all writing functions; or
3) activate an electronic signal which would electronically disconnect, block, or buffer control signals to or from the harddrive and/or network interface so as to selectively block write activity to all or part of the harddrive or network.
4) activate an electronic signal which would be detected by the peripheral device's controller which would then fully or partially disable portions of the peripheral device according to the predetermined definition associated with that switch.
5) activate an electronic signal which would be detected by the peripheral device's control processor which would then enable the configuration and storage of configuration data which would fully or partially disable the CPU's access to portions of the peripheral device.
6) activate an electronic signal which would be detected by the CPU and would enable sections of the BIOS code stored in firmware whereby this BIOS code would fully or partially limit access to at least on peripheral device.

The following discussion describes these various embodiments in greater detail.

EMBODIMENT 1

The simplest, but least selective, means for achieving the ends described above is shown in FIG. 1. This drawing shows a means for intercepting and interrupting the power to a typical harddrive peripheral device in a common variety of personal computers. In this typical example, the harddrive receives its power from a four pin connector to the computer's central power supply. Normally, the harddrive is powered on whenever the computer is on, and powered off whenever the computer is off. If, however, the harddrive is connected to connector 51 in FIG. 1, and the computer's central power supply output is connected to connector 52, then the user can selectively poweroff the harddrive by switching switch 53 to the disconnected position without disrupting the computer's normal operation. As long as switch 53 is in the disconnected position, the computer can be used, even with computer virus infected software, without risk of infecting or damaging information stored on the harddrive.

Switch 53 may be of a key locking type which is positioned in some accessible location so that the user can conveniently reach it.

In a typical application, a parent who uses a home computer for business applications may use this invention to turn off the harddrive and lock it out so that children may experiment with the computer and operate new, unusual, and highly suspect programs, without risk of damaging important business information.

In another typical application, a computer user who enjoys experimenting with new software traded among friends or loaded down from electronic bulletin boards, can use switch 53 to safeguard his harddrive from computer viruses while at the same time enjoying the indiscriminate use of programs which come from unknown or suspicious origins.

EMBODIMENT 2

The same ends can be achieved with a slight variation on the power switching method illustrated in FIG. 1. In this variation of the present invention the switch would physically disconnect the control lines to or from the peripheral controller. Typically this would involve the ability to disconnect the device select, write select lines, or other access signals which the controller uses to enable access to the peripheral device. When one or more of these control signals is disconnected, the computer would be able to run normally but would not be able to write information to the peripheral device.

EMBODIMENT 3

Figure 2:
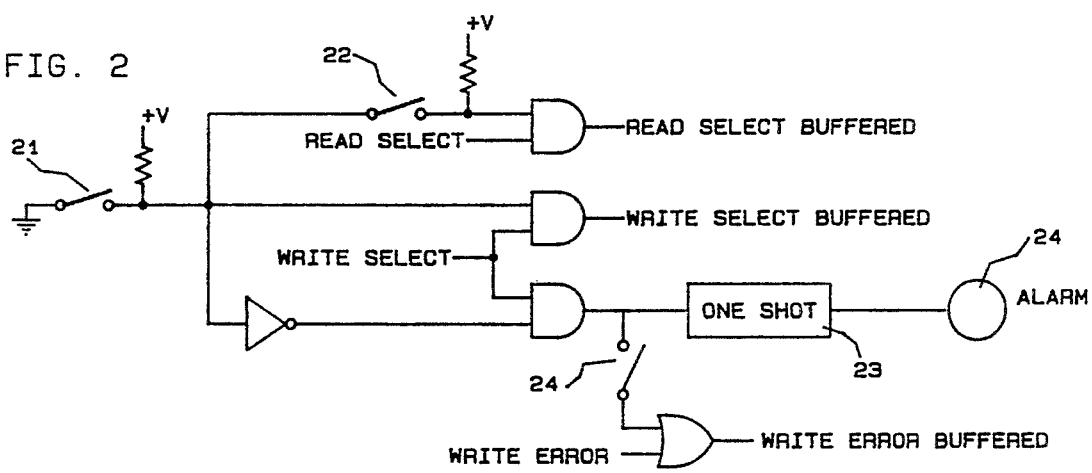
FIG. 2 is a schematic drawing of electronic circuit which can block all write accesses to a typical personal computer's harddrive whenever selected to do so by a user activated switch.

A more expensive, but more selective, means of achieving the above goals would involve the electronic switching of control signals to the peripheral device. An example illustrative of this means is shown in FIG. 2. This embodiment of the present invention would allow the user to selectively disable write access to a peripheral device such as a harddrive, while selectively maintaining the option to read data from the peripheral device. In addition, this electronic means demonstrates two optional features which would aid in the testing of software to identify the existence of computer viruses.

As shown in FIG. 2, switch 21 is used to alter an electronic logic level which is logically AND'ed with the normal write select signal to the peripheral device, such as a harddrive. When switch 21 is in the open position, a logical 1 is generated and the computer has normal access to the peripheral device. When switch 21 is in the closed position, a logical 0 is generated, the write select signal is blocked, and the all write access to the peripheral device is inhibited.

For the purpose of identifying improper user activity or the presence of a computer virus, it may be desirable to alert the user that a write command was attempted whenever switch 21 is in the closed position. For this purpose, the inverted signal from switch 21 is logically AND'ed with the write select signal to trigger a retriggerable oneshot logic device, 23, which in turn would sound the alarm, 24, for a minimum period of time.

As an additional option, the oneshot 23 could be configured to beep the alarm a single time whenever switch 21 is activated in order to audibly notify the user that the "quarantine" has been initiated. Another alternative would be to provide an LED which would remain lit whenever switch 21 is closed in order to provide a visual indicator to the user that write access to the harddrive is blocked and the "quarantine" is active. Neither of these two options are illustrated in FIG. 2.

Normally, the optional switch 22 in FIG. 2 would be left in the open position so that whenever switch 21 is in the closed position, the computer would have normal read access to the peripheral device but would not be able to write to it. However, in some circumstances the user may wish not only to protect the peripheral device from alteration but also wishes to lock out others from examining its contents. Switch 22 is provided for this circumstance. If it is desired to configure the electronics to also block read access to the peripheral whenever switch 21 is in the closed position, switch 22 is set to a closed position.

FIG. 2 also illustrates one additional optional feature, namely a feedback write error signal to the computer, or the peripheral's controller. In a typical application where the write select to a harddrive is blocked, the computer may think that it is successfully writing data to the harddrive. This may be a useful feature for tricking a computer virus into believing that it is successful in its write attempts. However, in some applications it may be desirable to alert the computer, and thereby the user, that write access is being blocked so that they can take corrective measures if necessary. Therefore, if a write error signal is desired, the inverse signal from switch 21 can be logically AND'ed with the write select signal to produce a logical 1 whenever a disallowed write attempt is made, which in turn can be logically OR'ed with the normal write error signal which is provided from the peripheral device so that the computer or controller will be notified that the write attempt did not succeed. Other control signals can be similarly controlled for similar or varied effects which achieve the same function of protecting data on the harddrive in all or some locations.

The circuitry of this embodiment could be added to the controller card for the peripheral at little cost during the time of design and manufacture. Alternatively, this circuitry could be placed on a separate expansion card as is typically used in personal computers, with the control cable extending from the controller card, which would normally be plugged directly into the peripheral device, being plugged instead into this separate expansion card. Another control cable, including the intercepted and buffered control signals, would then extend from the separate expansion card, containing the circuitry described in this embodiment of the present invention, to the peripheral device.

This embodiment of the present invention serves all of the above stated purposes but can also be used in additional applications. For example, a computer supervisor in a business could lock out write access to the harddrive so that staff can use the programs on the harddrive but not load unauthorized programs onto the harddrive. Users would be forced to save data files to unprotected media, such as diskettes. In another application, an individual can temporarily "quarantine" the harddrive by making it "read-only" while evaluating new software which may be infected with a computer "virus."

EMBODIMENT 4

Figure 3:
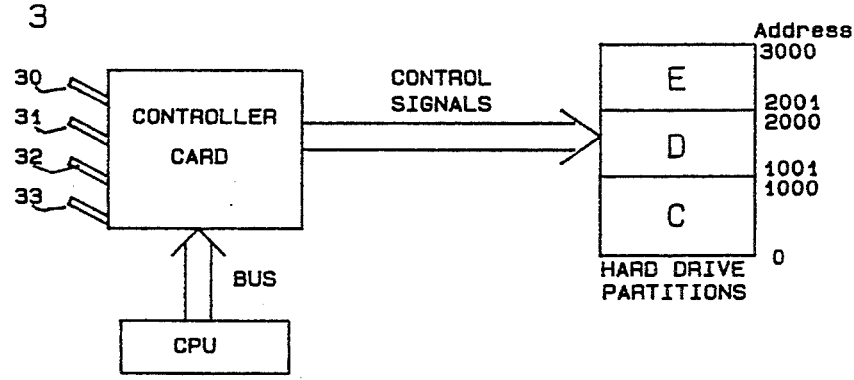
FIG. 3 is a block drawing which shows the relationship between a peripheral device such as a harddrive, the peripheral's controller card, and access switches which limit the computer's access to the peripheral device, and the computer's central processing unit.

FIG. 3 represents another embodiment of this invention which is illustrative of the scope of the invention. In this embodiment, the electronics and microcontrollers already present on the peripheral device's controller card would directly read and interpret the switches to carry out the processes disclosed in this invention. This arrangement is especially beneficial since it adds little or no cost to the consumer and manufacturer, and at the same time provides the user with increased flexibility in controlling access to all or part of the peripheral device.

The typical controller card is already capable of interpreting commands from the computer and implementing the appropriate read and write functions to the peripheral device. Typically, these actions of interpreting commands and implementing responses are under the control of a predefined logic circuit or a programmable microcontroller which operates a program from its fixed memory. In order to implement the present invention most effectively and at least cost, only a slight modification of the controller card is necessary. This modification would involve the addition of one or more switches which are read into the controller card's circuitry as additional control or configuration signals. The means for implementing the reading of these switches, and logically combining them to produce the desired results in either hardware logic or firmware programs are standard practices for all electronic and software designers, therefore no detailed explanation for the buffering of the switch signals is necessary.

These switches, may be of a toggle or key locking type, or may be implemented as a bank of miniature DIP switches in cases where there are a mutiplicity of options to partially disable access to the peripheral, or a combination of the above. In the typical application, these switches would be in a location easily accessible to the user on the outside of the computer. These switches might be advantageously located for accessibility on the front panel of the computer case, near or on the face of the harddrive, for example, or they may be placed on the cover plate for the controller card which fits in an expansion slot, such as is common for IBM-compatible computers. Other locations of convenience would be immediately obvious to computer and peripheral device designers.

Activation of these switches would allow the user to override the computer's instructions to the controller card for the peripheral device. For example, a user operated switch could be pre-defined to block all read and write access to all or a portion of the peripheral device. When this switch is activated, the controller logic circuit, or firmware, would ignore any commands coming from the computer to access the restricted portions of the peripheral device.

For the purpose of demonstrating the scope and power of this embodiment of the present invention, an example utilizing several switches to override computer access to a harddrive is described below and illustrated in block form in FIG. 3.

In this example, the harddrive is partitioned into 3 logical drives which are addressed by the computer as drives, C, D, and E. Each logical drive represents a portion of the physical harddrive which lies between specified sectors or addresses. For example, logical drive C may include sectors 0 through 1000, drive D sectors 1001 to 2000, and drive E sectors 2001 to 3000. When all four switches are in the off position, the controller card will allow the CPU to have normal, unlimited, read and write access to the harddrive.

When switch 30 is activated, the controller card's logic will force it to ignore all write commands to the C partition. This effectively makes the C partition read only. When switch 31 is activated, the controller card's logic will ignore all read and write commands to partition D. This effectively makes partition D completely inaccessible to the CPU. When switch 32 is activated, the controller card blocks all read commands to the E partition. This effectively makes partition E a write-only partition, the usefulness of which will be described below. Finally, when switch 33 is activated, the controller card disables certain normal commands and enables new functions. Namely, when switch 33 is activated the controller card ignores all commands to write over previously written blocks of data. This may include blocking out of any format command, and any erase, delete or copy over commands. This would effectively make the entire drive, or selected partitions, a write-once media. This means that once data is written, it cannot be altered as long as switch 33 is active. If a data file is changed, it must be saved to a new file name in a new, unused portion of the partition.

An example of how these functions would be used, and why they are useful follows. In this example, assume that a government agency is sending out auditors which must record and report sensitive information from a number of private businesses. Each auditor is supplied a portable computer, with a harddrive, and the access restriction switches described above. The audit software and a menu system which automatically loads onto the computer whenever the computer is turned on are loaded by the program supervisor onto partition C of each portable computer. Keylock switch 30 is activated and locked on before the unit is given to the auditors. This effectively guarantees that the auditor will not be able to load other, unauthorized programs onto the partition C thus risking doing damage to the computer's configuration for its assigned task.

Also, prior to issuing the portable computers to the auditors, switch 31 is activated to "turn off" partition D, which may contain programs and data which are used only when the auditor has returned from the field. For example, such programs may include communication software which is used to download the field information to the agencies main-frame computers. These programs are not needed in the field and so read and write access to this partition is completely blocked.

In addition, switch 32 may be locked into position. This causes partition E to temporarily become a write only drive. This may be useful as a means to protect sensitive information gathered in the field from being view or downloaded once it is entered into the system by the auditor. For example, the auditor goes to Business A and conducts his audit using the programs stored on the "read-only" partition C. Upon exiting the program, the field data is written to the "write-only" drive E. Now, as the auditor goes to Businesses B through J, this information cannot be retrieved for display or copying by persons who may gain access to the auditor's computer, since switch 32 has blocked all read attempts to this data. This sensitive information can be retrieved only upon return to the central agency where the project supervisor has the key to disable the "write-only" function caused by switch 32. Only then can the data be read and downloaded into the agencies mainframe.

In addition, the program supervisor may wish to audit the performance of the auditors, or prevent the auditors or other persons from accidentally or maliciously overwriting data, erasing data, or reformatting the harddrive while it is in the field. In this case, switch 33 can be activated which would make the entire drive, or at least partition E a "write once" drive. Now, a history of all data which was written to the drive is preserved and can be examined upon return to the central agency office. After the information is reviewed and downloaded to the agency's main-frame, switches 33 and 32 can be disabled and partition E can be completely erased in preparation for the next field audit.

EMBODIMENT 5

Another embodiment of this invention would provide the peripheral device control processor with a user activated configuration switch. When the switch is activated, the peripheral device can be configured with whatever access restrictions are desired. The configuration is saved in nonvolatile memory and the switch may be deactivated. The saving of the configuration information can take place before or after the switch is deactivated. Thereafter, the peripheral device control processor will allow the CPU only the accesses for which it was previously configured. By repitition of the above steps, the user can reconfigure the peripheral devices' access limitations as security needs change. Computer programmers will immediately recognize many ways to implement security software which can employ the configuration switch disclosed in this invention. Commercial security programs which allow user configuration, but lack a user accessible configuration switch, include Protec by Sophco, Totalsafe by EliaShim, and Cetus by FoundationWare. Jones (U.S. Pat. No. 5,144,659) has provided a detailed flowchart for software configuration of a CPU-independent, programmable security device for harddrives—though again lacking the user accessible configuration switch disclosed, herein. Thus, for those skilled in the art, the software implementation of the configuration switch is simple and an obvious two step process: At an appropriate juncture, prior to allowing reconfiguration of the security protocol, 1) read the state of the configuration switch, and 2) if it is in the correct state, allow the configuration process to continue.

As an example of this embodiment, assume that a harddrive is provided with a key locked configuration switch and configuration software. When the configuration software is run, the software checks for a predetermined flaw in the diskette to verify that the operator has access to the original diskette, a first level of security. A password is required to enter the configuration menu, a second level of security. The user is then instructed to activate the key lock using the provided key, a third level of security. While the key lock is activated, a menu is presented whereby the user can make certain partitions or sections, subdirectories, or even specific files or groups of files such as executable program files, either unrestricted, inaccessible, read-only, not-readable, write-only, or write-once. After the configuration has been entered, the menu is exited and the user is instructed to deactivate the key lock, remove the key, and store the key in a safe location. At a convenient juncture suited to the security protocol requirements, the configuration parameters are stored in non-volatile memory or written to a reserved section of the harddrive. Thereafter, whenever the harddrive is powered on, the control processor reads the configuration parameters into its working memory and restricts the CPU's harddrive access accordingly. If the CPU attempts to access a restricted zone or file, or attempts to erase or modify a read-only file, an alarm may sound to notify the user of potential virus activities. Once implemented, these configuration restrictions can be altered only by a person with access to the key which activates the configuration switch and with access to the configuration software.

EMBODIMENT 6

Finally, it should be noted that it is within the scope of this invention that the peripheral access control switches could be electronically sensed by the computer's own CPU. In this embodiment, the reading of the switch would take place at the system's low level BIOS, which is the program kernel which controls all input and output commands between the CPU and the peripheral controller cards. At this level, the BIOS code would recognize which peripheral access control switches are active and execute the appropriate BIOS subroutines which would limit the application software's access to the peripheral devices according to the predefined functions of the activated switches. Since the BIOS is typically implemented in firmware, this code cannot be altered by a program or programmer operating on the computer and so it would be difficult or impossible to bypass.

Ramifications, Scope of Invention and Conclusion

The present invention increases the security options available to computer users by introducing a new level of control over the computer's access to its peripheral devices. In the prior art, computers have had a direct and unlimited control over their peripheral devices. The user's control over the peripherals is implemented only through programming of the computer itself. But since a computer's CPU come under the control of an unauthorized user or dangerous programs such as computer viruses, this unlimited access to the peripheral places the authorized users data and programs which may be stored on the peripheral device at risk of alteration or deletion.

The present invention overcomes this inherent weakness in the prior art by implementing another level of user control over the computer. This control occurs directly at the mid-point between the computer's CPU which operates programs, and the peripheral devices which are directed by the CPU to implement programs retrieve and store data. Through the introduction of peripheral access control switches, this invention discloses a method by which the authorized user can fully or partially limit the computer's access to one or more of its peripheral devices. This added level of control allows the user to control the computer's activities so that access to these peripheral devices is allowed only under such conditions as the user feels are secure.

The method disclosed in this invention produces the following advantages:
- it allows the user to temporarily make all or portions of a peripheral device completely inaccessible to the computer;
- it allows the user to temporarily make all or portions of a peripheral device read-only;
- it allow the user to temporarily make all or portions of a peripheral device write-once so that important data may not be accidentally erased or written over;
- it allows the user to temporarily make all or portions of a peripheral device write-only so that sensitive data may not be read or copied except under authorized conditions.
- it provides means for alerting the user of unauthorized attempts by the computer to access a secured peripheral device which may aid in the detection and elimination of computer viruses or other interlopers.

Although the description above contains many specifications and precise examples, these should not be construed as limiting the scope of the invention but merely provide illustrations of some of the principle ways in which the invention can be implemented. Once disclosed, customizing of this process to suit an individual clients security needs will be obvious to one skilled in the art.

Thus, the foregoing is considered as illustrative of the principles of the invention, but is not by any means exhaustive. Numerous modifications and changes will be obvious to those skilled in the art, especially in the definition of each peripheral access control switches function. Therefore, it is not desired to limit the invention to the exact construction and process shown and described herein, and accordingly, all modifications and equivalents which utilize a user accessible switch which limits a computer's access to its peripheral devices fall within the scope of this invention.

I claim:
1. A computer security system comprising:
   (a) a computer with a working memory to perform program functions;
   (b) at least one computer controlled mass memory storage device for storing and retrieving data;
   (c) at least one power supply by which electric power is supplied to portions of said computer including said at least one computer controlled mass memory storage device;
   (d) a user operable hardware switch means between at least one of the mass memory storage devices and at least one of the power supplies, in which user actuation of the hardware switch causes electric power from any power supply connected to the hardware switch to be disconnected from any computer controlled mass memory storage devices connected to the hardware switch, without disruption of power to any other portion of said computer.

2. The computer security system of claim 1 wherein at least one of the computer controlled mass memory storage devices is a hard disk drive.

3. A computer security system comprising:
(a) a computer means with a working memory to perform program functions;
(b) at least one peripheral device;
(c) a control circuit means which is interconnected between said computer and said at least one peripheral device, whereby said computer's instructions are conveyed to said at least one peripheral device for implementation;
(d) at least one user operable switch means, connected to said control circuit, which when put into at least one state causes said control circuit to block at least one of said computer's instructions to said at least one peripheral device, whereby a user can prevent said peripheral device from responding to unwanted instructions from said computer.

4. The computer security system of claim 3 wherein at least one of the peripheral devices is a hard disk drive.

5. The computer security system of claim 3, further including an alarm means attached to said control circuit which is activated by said control circuit whenever at least one of said computer's instructions to said at least one peripheral device is blocked by said control circuit.

6. The computer security system of claim 3 wherein said at least one user operable switch includes a key means whereby the state of said at least one user operable switch can be altered only by a person using said key.

7. A computer security system comprising:
(a) a computer means with a working memory to perform program functions;
(b) at least one peripheral device;
(c) a control circuit means which is interconnected between said computer and said at least one peripheral device, whereby said computer's instructions are conveyed to said at least one peripheral device for implementation;
(d) a programmable memory means, attached to said control circuit, for storing access criteria which define at least one restriction on said computer's access to said at least one peripheral device;
(e) at least one user operable switch means, connected to said control circuit, which when activated in at least one state allows user entry of said access criteria into said programmable memory.

8. The computer security system of claim 7 wherein at least one state of said at least one user operable switch means causes said control circuit to block at least one of said computer's instructions to said at least one peripheral device.

9. The computer security system of claim 7 wherein at least one state of said at least one user operable switch means causes said control circuit to activate said at least one restriction defined in said access criteria for said at least one peripheral device.

10. The computer security system of claim 7, further including alarm means attached to said control circuit which is activated by said control circuit whenever at least one of said computer's instructions to said at least one peripheral device is blocked by said control circuit.

11. The computer security system of claim 7 wherein said at least one user operable switch includes a key means whereby the state of said switch can be altered only by a person using said key means.

12. The computer security system of claim 7 wherein at least one of said at least one peripheral devices is a computer controlled mass memory storage device.

13. The computer security system of claim 12 wherein said computer controlled mass memory storage device is a harddrive.

14. A security method for a computer having at least one peripheral device which comprises the steps of:
(a) interposing a control circuit means having a programmable memory and at least one user operable switch means between said computer and said at least one peripheral device;
(b) entering into said programmable memory access criteria for said peripheral device, where said access criteria define at least one restriction on said computer's access to said at least one peripheral device;
(g) allowing access to said control circuit and said programmable memory by said computer for initialization and modification of said access criteria only when said at least one user operable switch is activated and disallowing access to said control circuit and said programmable memory by said computer when said at least one user operable switch is deactivated;
(h) requiring said control circuit to allow said computer's instructions to be conveyed to said at least one peripheral device when said computer's instructions are allowed by said access criteria; and
(i) requiring said control circuit to block said computer's instructions to said at least one peripheral device when said computer's instructions are not allowed by said access criteria.

15. The method of claim 14 further providing said at least one user operable switch with at least one key means which limits operation of said at least one user operable switch and requiring use of said at least one key whenever a user activates said at least one user operable switch prior to initialization and modification of said access criteria.

16. The method of claim 14 also allowing keyboard entry of a password when said at least one user operable switch is activated prior to initialization and modification of said access criteria.

17. The method of claim 14 also providing an alarm means, attached to said control circuit, which is activated whenever said control circuit blocks an attempted unauthorized instruction from said computer to said at least one peripheral device.

18. The method of claim 14 also requiring that at least one state of said at least one user operable switch means causes said control circuit to block at least one of said computer's instructions to said at least one peripheral device.

19. The method of claim 14 also requiring that at least one state of said at least one user operable switch means causes said control circuit to activate said at least restriction defined in said access criteria for said at least one peripheral device.

20. The method of claim 14 wherein at least one of said at least one peripheral devices is a computer controlled mass memory storage device.

* * * * *

UNITED STATES PATENT AND TRADEMARK OFFICE
CERTIFICATE OF CORRECTION

PATENT NO. : 5,434,562
DATED : July 18, 1995
INVENTOR(S) : David C. Reardon

It is certified that error appears in the above-indentified patent and that said Letters Patent is hereby corrected as shown below:

On the title page item [76] should read --David C. Reardon, 73 Silver Rod Drive, Springfield, Il 62707-9687--.

Signed and Sealed this

Twenty-sixth Day of September, 1995

*Attest:*

BRUCE LEHMAN

*Attesting Officer*          Commissioner of Patents and Trademarks